United States Patent Office 3,535,123
Patented Oct. 20, 1970

3,535,123
HIGH DE STARCH HYDROLYSATE SYRUPS AND METHOD OF PREPARATION
Robert E. Heady, Park Forest, Ill., assignor to CPC International Inc., a corporation of Delaware
No Drawing. Filed Oct. 24, 1967, Ser. No. 677,736
Int. Cl. C13k 1/06
U.S. Cl. 99—142
20 Claims

ABSTRACT OF THE DISCLOSURE

Covers starch hydrolysate products having a dextrose equivalent of 25–55, a relatively high proportion of low molecular weight oligosaccharides of about 60–85% based on total carbohydrate hydrolysate solids, and a corresponding relatively low proportion of high molecular weight oligosaccharides less than 35%. The hydrolysate is further characterized by the following relationship:

$$\frac{DE}{DP_{2-6}/DP_{7+}} = n$$

where $DP_{2-6}$ is the percent of low molecular weight oligosaccharides present in the hydrolysate having a degree of polymerization of from 2 to 6, $DP_{7+}$ is the percent of high molecular weight oligosaccharides in said hydrolysate having a degree of polymerization of 7 and higher, DE is the dextrose equivalent of said hydrolysate and $n$ is a number between 4 and 12. Said hydrolysate may be in the form of a solid or liquid syrup. Also covers a method of making the just described hydrolysate by employment of an enzyme system or enzyme mixture having at least alpha-amylase and pullulanase enzyme activity.

---

The starch industry is continually striving toward achievement of various starch conversion products, such as syrups which can be tailor-made to meet a vast number of needs. One particular area of endeavor involves production of a relatively high DE syrup which also has a minimal dextrose content and contains a high proportion of lower oligosaccharides, say those materials having a degree of polymerization of 2–6. Such syrup, if it could be prepared, would have a low level of sweetness, and a sufficiently high viscosity so as to be useful in formulation of a number of products. For example, this syrup would have particular utility as an ingredient in ice cream, hard candies, fondants and baked goods. If the syrup just described could be made available via a simplified and economical technique, the product and its mode of preparation would find ready acceptance in the art.

It therefore becomes an object of the invention to provide a low sweetness, high viscosity starch hydrolysate syrup useful as an ingredient in a number of food formulations.

Another object of the invention is to provide a syrup having a relatively low dextrose content and a high proportion of oligosaccharides having a degree of polymerization ranging from two to about six.

Still another object of the invention is to proivde the just described starch syrup which further has a relatively low content of higher oligosaccharides having a degree of polymerization of seven and higher.

Still another object of the instant invention is to provide a simplified technique of making the above syrups via a novel starch conversion process.

In yet another object of the invention, a relatively high DE, low dextrose starch syrup is made by enzymatically converting starch with an enzyme system containing at least alpha-amylase and pullulanase activities.

A still further object of the invention is to provide an enzyme conversion system to achieve the just described starch hydrolysates, which system is adaptable to converting a wide variety of starchy materials derived from a number of varying sources.

Other objects will appear hereinafter.

In accordance with the invention a novel starch hydrolysate syrup has been made having the following characteristics. The hydrolysate is specifically described as having a relatively high DE ranging from about 25 to about 55, a relatively high proportion of low molecular weight oligosaccharides of about 60–85% based on total carbohydrate hydrolysate solids present, and a corresponding relatively low proportion of high molecular weight oligosaccharides of less than 35% and usually 10–30%. The starch hydrolysate may be in form of a liquid syrup or a solid without departing from the scope of the invention.

It has been further discovered that the starch hydrolysate products of the invention are characteristically defined by having a DE value 4 to 12 times the $DP_{2-6}/DP_{7+}$ ratio, i.e. $DE/_{4-12} = DP_{2-6}/DP_{7+}$.

$$\text{Thus } \frac{DE}{DP_{2-6}/DP_{7+}} = n$$

where $DP_{2-6}$ is the percent of low molecular weight oligosaccharides in said hydrolysate having a degree of polymerization from 2 to 6, $DP_{7+}$ is the percent of high molecular weight oligosaccharides and said hydrolysate having a degree of polymerization of 7 and higher, DE is the dextrose equivalent of said hydrolysate, and $n$ is a number between 4 and 12. In the more typical case $n$ is a number between 6 and 12.

Previously known starch hydrolysate syrups in the range of 25 to 55 DE, whether made by acid hydrolysis or enzyme hydrolysis or combination treatments thereof, have corresponding $n$ values ranging from 15 to as high as 35. For example, acid converted syrups will have values above 15. Alpha-amylase syrups will have values in the range of above 13 up to 20, and malt-converted products will have values above 15.

The term DE (dextrose equivalent) is used herein to refer to the reducing sugars content of the dissolved solids in a starch hydrolysate expressed as dextrose as measured by the Luff-Schoorl Method (NBS Circular C–440, p. 195 as appearing in "Polarimetry, Saccharimetry and the Sugars." Authors: Frederick J. Bates and Assoc.).

The above hydrolysates are best made by enzymatically hydrolyzing a starch substrate by means of an enzyme system having both alpha-amylase and pullulanase enzyme activity as described in more detail below.

The just described starch syrups have exceptional utility in that they have sufficient body in terms of a relatively high viscosity to enable them to be used as food carriers, while they concomitantly exhibit a low degree of sweetness. Yet, on the other hand, the syrups have a sufficiently high DE, particularly as derived from their high proportion of oligosaccharides having a degree of polymerization of 2–6, so as to render the syrups sufficiently sweet for their intended use. Thus, these syrups are particularly useful in ice cream formulations and like edible foods requiring syrup characteristics as just described.

As noted above the just described syrups are conveniently prepared by enzymatically hydrolyzing a starch source with both alpha-amylase and pullulanase enzymes. However, other methods may produce starch hydrolysates of the defined character.

The alpha-amylase enzyme source may be widely varied. A preferred enzyme system may be derived from the use of alpha-amylase produced by the bacterium, *Bacillus subtilis*. Commercial preparations of this enzyme are available and are sold under such trade names as Miles HT 1000, produced by Miles Laboratory, Rhozyme H 39, produced by Rohm and Haas, and Wallerstein CPR-8, produced by Wallerstein Laboratory.

The amount of alpha-amylase employed may vary considerably depending upon the amount of pullulanase enzyme utilized, the particular source of starch being worked, etc. However, excellent results are achieved when one employs 100–20,000 units of alpha-amylase per kilogram of dry basis starch. Measurement of the activity of an alpha-amylase preparation, in terms of these units, is made by allowing the enzyme to react with a standard starch solution under standardized conditions. The amount of activity is measured by the rate at which the iodine-staining capacity of the starch is decreased.

More specifically, the activity of the bacterial alpha-amylase is measured by a modified procedure based on the dextrinogenic assay of Smith and Roe, J. Biol. Chem. 179: 53, (1949), relying on the reduction of blue color in a starch-iodine complex as the basis of the assay. Here one unit of activity is the amount of enzyme required to hydrolyze 10 mg. of starch per minute reaction time under the specified conditions. Thus, for example, the alpha-amylase sold under the trademark Miles HT 1000 had an activity of 4000 units/gram.

After determining the activity of the alpha-amylase in a particular enzyme preparation employed, it is a simple matter to determine what quantity of enzyme preparation is needed to give the desired units of activity per kilogram of dry starch substance.

The enzyme, pullulanase, or amylopectin-1,6-glucosidase is elaborated during the submerged culture fermentation by strains of the bacterium, *Aerobacter aerogenes*, when suitably incubated under conditions of aerobic culture. Other sources may be used.

Characteristics by which members of the species *Aerobacter aerogenes* may be distinguished are described by M. W. Yale, R. S. Breed, et al., in "Bergey's Manual of Determinative Bacteriology," seventh edition, pp. 341–42, 1957 (Williams and Wilkins Co., Baltimore), although it is well recognized by those skilled in the science that mutant strains may be isolated from time to time which do not completely conform to this identical description.

One method of producing the enzyme pullulanase is described by Hans Bender and Kurt Wallenfels in an article entitled "Specific Decomposition by a Bacterial Enzyme." The article appeared in "Biochemische Zeitschrift," 334, 79–95 (1961).

A typical source of the *Aerobacter aerogenes* culture was the American Type Culture Collection, 12301 Parklawn Drive, Rockville, Md. The designation of the culture was *Enterobacter aerogenes* ATCC 8724. One method of obtaining the enzyme from the culture is as follows:

A medium containing:

| | Percent |
|---|---|
| Difco Bacto-peptone | 0.8 |
| Maltose | 0.5 |
| Sodium nitrate | 0.3 |
| Dibasic potassium phosphate | 0.05 |
| Potassium chloride | 0.05 |
| Ferrous sulfate heptahydrate | 0.001 | is prepared. The above medium is adjusted to a pH of 7.2 and dispensed into 1,000 milliliter Erlenmeyer flasks, 200 milliliters per flask. The flasks are stoppered with cotton plugs and sterilized.

The culture inoculum is obtained by aseptically transferring from an agar slant, cells of a pure culture of the microorganism *Aerobacter aerogenes* ATCC 8724, into a sterilized flask with the above medium. The flask is then placed on a reciprocal shaker in a constant temperature room operated at 29° C. The flask is shaken for 6 hours after which time the culture has grown abundantly and is ready to be used to inoculate flasks of the above defined medium. 10 milliliters are aseptically transferred to each of the enzyme production flasks. These flasks are then placed on a reciprocal shaker in a constant temperature room operated at 29° C. They are shaken for a period of time from 66 to 72 hours. At the end of the fermentation the flasks are removed from the shaker, their contents pooled and the cells therein removed from the culture liquor by centrifugation. The supernatant liquor is then adjusted to pH 6.2 and preserved by the addition of toluene. An aliquot of the supernatant liquor is then assayed for enzyme activity.

A concentrated dried preparation of the pullulanase enzyme may be obtained by the following procedure:

1500 milliliters of chilled (4° C.) acetone is added to 1 liter of chilled (4° C.) cell-free culture liquor containing 10 grams of diatomaceous earth. After complete mixing the suspension is vacuum filtered to recover the insolubilized enzyme. Upon completion of filtration, the filter cake is recovered, spread, and allowed to dry overnight at room temperature. Once the filter cake is dried it is assayed for pullulanase enzyme activity.

The level of pullulanase enzyme activity present in pullulanase preparations may be determined as follows:

An aliquot of enzyme solution is adjusted to pH 5.5 and 1.0 milliliter is added to a digestion mixture composed of 2 milliliters of a 5% pullulan solution and 7 milliliters of a M/50 phosphate buffer, pH 5.5. The reaction is carried out in test tubes placed in a 40° C. water-bath and is allowed to proceed for 1 hour. At the end of the digestion period, the reaction is stopped by the addition of hydrochloric acid to lower the pH to 3.0. The reducing sugar content of the digestion mixture is determined, as well as that of the culture liquor and pullulan used, by a modification of the alkaline potassium ferricyanide method described hereinafter and is expressed as microgram equivalents of dextrose. Pullulanase enzyme activity is calculated as follows:

$$A = \frac{T-(C+P)}{180 \times 60} \times D$$

where

A = Pullulanase enzyme activity, units per milliliter or gram of enzyme preparation.
T = Total reducing sugars in digestion mixture in micrograms.
C = Residual reducing sugars in culture liquor in micrograms.
P = Reducing value of the pullulan polysaccharide used in the digestion mixture in micrograms.
D = Dilution factor of enzyme preparation.
180 = Reducing value of 1 micromole of dextrose.
60 = Time (minutes) of reaction.

One unit of pullulanase is defined as the amount of enzyme required to produce 180 micrograms of reducing sugars, calculated as dextrose, per minute from pullulan under the conditions specified above.

The polysaccharide, pullulan, which is a polymer of maltotriose units connected to each other by alpha 1–6 linkages, may be obtained from *Pullularia pullulans* ATCC 9348 by use of the procedure of S. Ueda, K. Fujita, K. Komatsu, and Z. Nakashima which appeared in "Applied Microbiology 11, 211–215 (1963)."

The modified potassium ferricyanide assay procedure used for determination of reducing agents in assaying enzyme preparations is conducted as follows:

REAGENTS

Alkaline ferricyanide: Dissolve 1.170 g. of potassium ferricyanide and 19.5 g. of anhydrous sodium carbonate in water and dilute to 1 liter. Store in amber bottle. Standard dextrose solution, 0.1 mg./ml.: Weigh 1.000 g. of pure anhydrous dextrose and dilute to 100 ml. Using a class A pipette, transfer 10.0 ml. of the solution to a 1 liter flask and dilute to mark.

PROCEDURE

Standardization: Pipette 0.5-, 1.0-, 1.5-, 2.0-, and 2.5-ml. aliquots of standard dextrose solution, 0.1 mg./ml., into respective 18-cm. test tubes. Then water is added in amounts to bring the total volume of the respective tubes to 2.5 ml. The reagent blank contains 2.5 ml. of water. To each tube is then added 5 ml. of the alkaline ferricyanide solution. The mixture is then heated in a boiling waterbath for exactly 5 minutes, cooled immediately in a tap-waterbath, diluted to 12.5 ml. volume with water and mixed. Using water as reference solution at 0 adsorbence, determine the absorbency of the blank and of each of the standard tubes at 373 m$\mu$ on a Beckman DU spectophotometer, using 1-cm. cuvettes.

ANALYSIS

An aliquot of enzyme preparation is used which will produce from 1 to 10 mg. reducing sugars per 10 ml. digestion mixture. The sample of the digestion mixture assayed by this method will contain from 50 to 250 micrograms of reducing sugar.

CALCULATION

Plot absorbences of standard tubes corrected for blank versus micrograms of dextrose per 12.5 ml. on linear coordinate graph for standardization curve.

Again, the amount of pullulanase enzyme used in conjunction with the alpha-amylase will be somewhat dependent upon the other variables of the process. Usually, greater than 100 units of pullulanase per kilogram of dry basis starch are necessary to effect the desired conversion. Most often, the desirable level of pullulanase activity varies from about 250 units to about 2000 units.

The starch undergoing conversion in the invention may be chosen from a wide variety of sources. Suitable starches include cereal starches such as corn, grain, sorghum and wheat; waxy starches such as waxy milo and waxy maize; and root starches such as potato starch and tapioca starch. Crude starch sources may also be used, such as ground cereals, macerated tubers or the partially purified starches therefrom.

The invention is particularly adaptable to conversions of starch which have a relatively high amylopectin content of at least 50%. An exemplary starch of this type is waxy milo.

Prior to enzymatic attack, the starch should be placed in a proper solubilized condition by gelatinization. Gelatinization is carried out by heating a starch to a temperature exceeding about 60° C. in the presence of moisture. It is also preferred that the gelatinized starch be pretreated by conventional thinning techniques such as by acid or alpha-amylase hydrolysis to a low DE, not exceeding about 15, and preferably less than about 5.

In production of the syrups of the invention, the conversions can be performed at relatively high dry substance levels usually within the range of about 15 to about 40% to reduce tank size requirements and evaporation costs. The temperature of conversion may range within a rather broad range, and is preferably 30–70° C. Most preferably, in order to retard or prevent microbial spoilage of the conversion liquors, the hydrolysis is run at relatively high temperatures, such as, for example, about 50° C. to about 60° C.

Again, the conversions may be performed over a relatively wide pH range of say about 4.0 to about 8.0, with the preferred range being 5.0 to 7.0. The time required for conversion of starch to the syrup of proper constituency will depend upon the enzyme dosage employed, and the extent of conversion desired. However, desirable syrup products can be produced conveniently at reasonable enzyme dosages within 24 to 144 hour conversion periods, and preferably within 48–120 hours.

During the process it may be convenient to agitate the starch undergoing hydrolytic cleavage. However, such step is not necessarily required, and the starch hydrolysate may be allowed to remain quiescent.

The conversion of the starch is effected with the simultaneous use of the alpha-amylase enzyme and the pullulanase, or the pullulanase is applied first or after application of the alpha-amylase enzyme. For example, one or the other enzyme is added initially and allowed to act upon the starch for 24–72 hours prior to addition of the second enzyme. The preferred practice is to add the alpha-amylase and pullulanase enzymes simultaneously. In such case the dry forms of both enzyme preparations may be admixed and the mixture added to the starch substrate in a single addition or series of additions.

At the completion of the conversion the starch syrup products may be concentrated and/or refined. Generally the hydrolysate is concentrated to a solids content in excess of 50%. Likewise, the products may be refined by conventional methods such as carbon refining, ion exchange treatment, and the like to obtain syrups of proper quality.

If desired, a starch hydrolysate solid may be derived from the above syrup by concentrating up to a point where a solid phase is achieved. Such solids may still contain 5–15% entrained water.

The combined effect of the two enzyme preparations in achieving the desired syrups is truly synergistic in nature. As briefly mentioned above, action of the alpha-amylase component in relatively low quantities is not effective in achieving the desired high DE. In such case the hydrolysate has a large proportion of higher oligosaccharides having a degree of polymerization of 7 and higher. Upon addition of gross amounts of alpha-amylase one does obtain an increased DE, but the product contains a large proportion of dextrose component, which may be a distinct drawback depending upon the particular end-use.

On the other hand, sole use of the pullulanase enzyme has substantially little effect whatsoever in converting a gelatinized starch. In most cases, the DE of a product obtained by pullulanase enzymatic attack alone upon a gelatinized starch is hardly measurable. In absence of the alpha-amylase component, the pullulanase effect upon a fresh starch substrate is that of debranching only.

Thus, only through use of the unique combination of enzymes is one able to obtain syrups carefully defined above having the desired properties and component breakdown. In particular, only through the combined effect of the alpha-amylase and pullulanase enzymes can one achieve syrups having relatively low contents of glucose, and low contents of higher oligosaccharides having seven or more units, along with properties of high DE and high proportion of lower oligosaccharides of two to six units.

The following examples illustrate typical syrups of the invention and their mode of preparation. It is understood, of course, that these examples are merely illustrative, and that the invention is not to be limited thereto.

EXAMPLE I

In this example a number of runs were made involving enzymatic conversion of a waxy milo starch utilizing pullulanase and alpha-amylase enzymes, both separately and in combination. The waxy milo starch in this case was first gelatinized and thinned with alpha-amylase to 2–4 DE. In the several runs the degree of conversion was varied by either adjustment of the period of conversion or amount of enzyme activity utilized. After the conversion period was terminated the hydrolysates were analyzed for DE, dextrose content, lower oligosaccharides content, that is for those oligosaccharides having a degree of polymerization ranging from 2 to 6, and higher oligosaccharide content of sugars containing 7 or more units. The measurement of the various components making up the hydrolysate was effected by known quantitative paper chromotography methods. Miles HT 1000 was the source of alpha-amylase. The data is presented below in Table I.

As is evident from the experimental results, only through use of the combination of enzymes does one realize a hydrolysate having the desired DE range, and lower and higher oligosaccharide contents falling within the defined limits of the invention. In particular, we have found that all those hydrolysates of the invention as produced through the combination use of pullulanase and alpha-amylase in appropriate amounts were characteristically described by the expression:

$$\frac{DE}{DP_{2-6}/DP_{7+}}=n$$

activity of the type exhibited when combined with alpha-amylase.

It will also be noted that syrups of the desired composition fitting the above descriptive formula may not be obtained when the conversion DE is below about 25.

TABLE I.—CONVERSION OF WAXY MILO STARCH

| DE range | Alpha-amylase units/100 g. d.s. | Pullulanase units/100 g. d.s. | DE | $DP_1$* | $DP_{2-6}$* | $DP_{7+}$* | $DP_{2-6}/DP_{7+}$ | $\frac{DE}{DP_{2-6}/DP_{7+}}$ | Hours of conversion |
|---|---|---|---|---|---|---|---|---|---|
| 20–25 | 100 | 0 | 21.7 | 3.0 | 49.6 | 47.4 | 1.05 | 20.6 | 68 |
| 25–30 | 200 | 0 | 27.9 | 5.2 | 56.8 | 38.0 | 1.49 | 18.7 | 88 |
| 30–35 | 400 | 0 | 34.3 | 8.2 | 60.6 | 31.2 | 1.94 | 17.7 | 95 |
| 35–40 | 800 | 0 | 40 | 11.2 | 60.0 | 29.2 | 20.6 | 19.4 | 95 |
| 40–45 | 1,600 | 0 | 43.8 | 14.2 | 60.7 | 25.3 | 2.39 | 18.3 | 95 |
| 20–25 | 100 | 100 | 24.3 | 2.7 | 61.7 | 35.6 | 1.73 | 14.0 | 68 |
| 25–30 | 100 | 100 | 25.7 | 2.9 | 68.1 | 29.0 | 2.35 | 10.9 | 88 |
| 30–35 | 100 | 100 | 31.1 | 5.2 | 71.2 | 24.6 | 2.89 | 10.8 | 95 |
| 30–35 | 200 | 100 | 34.2 | 7.1 | 74.1 | 17.8 | 4.16 | 8.2 | 88 |
| 35–40 | 200 | 100 | 35.5 | 7.3 | 71.5 | 21.2 | 3.37 | 10.5 | 95 |
| 35–40 | 200 | 200 | 36.8 | 7.1 | 77.1 | 15.8 | 4.87 | 7.6 | 95 |
| 40–45 | 400 | 100 | 40.2 | 10.0 | 74.3 | 15.7 | 4.75 | 8.5 | 95 |
| 40–45 | 400 | 200 | 41.5 | 9.7 | 78.1 | 12.2 | 6.42 | 6.5 | 95 |
| Pullulanase alone | | 100 | 2–4 | 0.0 | 0.0 | 100 | | | |

* Percent of total carbohydrates.

where $n$ is a member from 4 to 12. Starch hydrolysates formed by use of alpha-amylase alone even in gross amounts were well outside the maximum figure of 12. In particular, use of low amounts of alpha-amylase resulted in a relatively low proportion of lower oligosaccharides and a relatively high proportion of higher oligosaccharides. On the other hand, use of exceptionally high levels of alpha-amylase resulted in an undesirable high level of dextrose, leading to undue sweetness, and the hydrolysate therefrom fell well without the limits of the invention in terms of the formula set out above. Thus, it can readily be seen that definition of the starch hydrolysates in terms of the just presented formula is especially important in characterizing materials that are particularly sought after in a number of applications.

EXAMPLE II

In this example, corn starch which was alpha-amylase thinned as in Example I was hydrolyzed again using a combination of pullulanase and alpha-amylase enzymes. Miles HT 1000 was the alpha-amylase source. Also, alpha-amylase was used alone as was pullulanase. As seen in Table II, only through the combination of the enzymes could one obtain hydrolysates as characteristically defined herein. That is, only through use of this unique combination could one obtain the products of relatively low glucose content, relatively high DE, low higher oligosaccharide content and high lower oligosaccharide content. Again, these products are best defined by the mathematical relationship set out above. That specific formula conveniently and simply describes the make-up of the starch hydrolysates of the invention produced via the combination of enzymes utilized here.

Also, it is seen from this example that the defined starch hydrolysates may be obtained by carrying out the process of the invention on a number of starchy materials derived from varying sources.

TABLE II.—CONVERSION OF CORN STARCH

| DE range | Alpha-amylase units/100 g. d.s. | Pullulanase units/100 g. d.s. | DE | $DP_1$* | $DP_{2-6}$* | $DP_{7+}$* | $DP_{2-6}/DP_{7+}$ | $\frac{DE}{DP_{2-6}/DP_{7+}}$ | Hours of conversion |
|---|---|---|---|---|---|---|---|---|---|
| ²0–25 | 12.5 | 0 | 22.5 | 2.1 | 58.3 | 39.6 | 1.47 | 15.3 | 72 |
| 20–25 | 25 | 0 | 20.8 | 1.7 | 56.1 | 42.2 | 1.30 | 16.0 | 24 |
| 20–25 | 50 | 0 | 24.3 | 2.8 | 61.2 | 36.0 | 1.70 | 14.3 | 24 |
| 20–25 | 25 | 0 | 24.0 | 2.4 | 62.1 | 35.5 | 1.75 | 13.75 | 48 |
| 25–30 | 25 | 0 | 26.1 | 3.4 | 64.3 | 32.3 | 1.98 | 13.2 | 72 |
| 25–30 | 100 | 0 | 27.5 | 3.7 | 65.1 | 31.2 | 2.09 | 13.2 | 24 |
| 30–35 | 100 | 0 | 32.7 | 7.1 | 65.6 | 27.3 | 2.40 | 13.6 | 72 |
| 30–35 | 200 | 0 | 30.9 | 5.3 | 66.3 | 28.4 | 2.33 | 13.3 | 24 |
| 30–35 | 300 | 0 | 32.7 | 7.4 | 65.5 | 27.1 | 2.42 | 13.5 | 24 |
| 30–35 | 400 | 0 | 34.6 | 8.5 | 65.3 | 26.2 | 2.5 | 13.8 | 24 |
| 35–40 | 400 | 0 | 39.5 | 11.9 | 65.4 | 22.7 | 2.88 | 13.7 | 72 |
| 35–40 | 800 | 0 | 37.3 | 10.2 | 64.8 | 25.0 | 2.59 | 14.4 | 24 |
| 40–45 | 800 | 0 | 41 | 13.1 | 65.4 | 21.5 | 3.04 | 13.5 | 48 |
| 40–45 | 1,600 | 0 | 41.7 | 12.5 | 66.1 | 21.4 | 3.09 | 13.5 | 24 |
| 45–50 | 1,600 | 0 | 49.0 | 17.8 | 64.7 | 17.5 | 3.70 | 13.2 | 72 |
| 20–25 | 12.5 | 100 | 20.1 | 1.2 | 54.3 | 44.5 | 1.22 | 16.5 | 48 |
| 20–25 | 12.5 | 100 | 23.2 | 1.8 | 59.7 | 38.5 | 1.55 | 15.0 | 72 |
| 20–25 | 25 | 100 | 20.7 | 1.3 | 53.6 | 45.1 | 1.18 | 17.4 | 24 |
| 20–25 | 25 | 100 | 23.9 | 2.3 | 64.4 | 33.3 | 1.93 | 12.4 | 48 |
| 20–25 | 50 | 100 | 24.2 | 2.4 | 63.4 | 34.2 | 1.86 | 13.0 | 24 |
| 25–30 | 25 | 100 | 27 | 2.8 | 70.6 | 26.6 | 2.65 | 10.2 | 72 |
| 25–30 | 50 | 100 | 30 | 4.6 | 71.4 | 24 | 2.96 | 10.1 | 72 |
| 25–30 | 100 | 100 | 27.8 | 3.9 | 68.1 | 28.0 | 2.44 | 11.4 | 24 |
| 30–35 | 100 | 100 | 33.8 | 7.0 | 72.3 | 20.7 | 3.5 | 9.6 | 72 |
| 30–35 | 200 | 100 | 30.6 | 5.8 | 69.8 | 24.4 | 2.87 | 10.7 | 24 |
| 30–35 | 300 | 100 | 33.6 | 7.9 | 68.8 | 23.3 | 2.95 | 11.4 | 24 |
| 30–35 | 400 | 100 | 34.7 | 8.3 | 69.7 | 23.0 | 3.03 | 11.4 | 24 |
| 35–40 | 200 | 100 | 38.6 | 9.4 | 72.1 | 18.5 | 3.90 | 9.9 | 72 |
| 35–40 | 800 | 100 | 38.8 | 12.2 | 67.8 | 20.0 | 3.39 | 11.4 | 24 |
| 40–45 | 300 | 100 | 40.6 | 11.1 | 72.3 | 16.6 | 4.36 | 9.3 | 72 |
| 40–45 | 400 | 100 | 42.8 | 12.0 | 71.5 | 17.5 | 4.03 | 10.6 | 72 |
| 40–45 | 800 | 100 | 43.9 | 13.5 | 70.6 | 15.9 | 4.45 | 9.8 | 48 |
| 40–45 | 1,600 | 100 | 43.3 | 13.1 | 69.6 | 17.3 | 4.06 | 10.7 | 24 |
| 45–50 | 800 | 100 | 47.3 | 14.3 | 72.4 | 13.3 | 5.43 | 8.7 | 72 |
| 45–50 | 1,600 | 100 | 49.3 | 16.5 | 70.5 | 13.0 | 5.4 | 9.1 | 48 |
| 50–55 | 1,600 | 100 | 52.7 | 18.0 | 71.9 | 10.1 | 7.14 | 7.4 | 72 |

* Percent of total carbohydrates.

As also noted in the table, use of pullulanase alone showed substantially no activity in converting starch. It was thus entirely unexpected that the combination of the two enzymes would yield results as shown below, and particularly that pullulanase would demonstrate enzymatic

EXAMPLE III

As set out above, the process of the invention may be effected by using a combination of pullulanase and alpha-amylase in a simultaneous addition to the starch, or by adding one before the other and allowing partial conversion to take place before addition of the second enzyme.

Here, the different procedures of conversion are illustrated. In one case a waxy sorghum starch is treated with pullulanase for 72 hours prior to the addition of alpha-amylase. In the second procedure the alpha-amylase and pullulanase enzymes are added simultaneously to the starch. In the third manner of preparation aliquots (50 units/100 g. d.s.) of pullulanase are added to the conversion liquor. The first aliquot of pullulanase is added simultaneously with the alpha-amylase, the second aliquot 24 hours later after alpha-amylase addition, and the third aliquot 48 hours after addition of the alpha-amylase.

Results are presented in Table III below. As is clearly evident products falling within the limits set out here are still formed regardless of the sequence of addition of the two enzymes involved.

having the characteristics outlined in claim 1 which comprises converting a gelatinized starch by contact with at least one enzyme preparation containing alpha-amylase and pullulanase activity, and terminating said conversion when said syrup is obtained.

7. The method of claim 6 wherein said conversion is carried out at 30–70° C. for at least 24 hours.

8. The method of claim 7 wherein said contact is carried out over 24–144 hours at a pH of from 4.0 to 8.0.

9. A method of producing a starch hydrolysate syrup having the characteristics outlined in claim 1 which comprises subjecting a gelatinized starch to conversion with an alpha-amylase enzyme preparation and a pullulanase enzyme preparation, and terminating said conversion when said syrup is obtained.

10. The method of claim 9 wherein said conversion is carried out at 30–70° C. for at least 24 hours.

TABLE III

| Alpha-amylase units/100 g. d.s. | Pullulanase units/100 g. d.s. | DE | $DP_1$[1] | $DP_{2-6}$[1] | $DP_{7+}$[1] | $DP_{2-6}/DP_{7+}$ | $\dfrac{DE}{DP_{2-6}/DP_{2-7}}$ | Hours of conversion |
|---|---|---|---|---|---|---|---|---|
| 40  | 0 | 25.6 | 5.5 | 54.4 | 40.1 | 1.36 | 18.8 | 96 |
| 200 | 0 | 28.7 | 5.6 | 58.2 | 36.2 | 1.61 | 17.8 | 96 |
| 200 | [2] 150 | 37.4 | 5.4 | 78.3 | 16.3 | 4.80 | 7.8 | 96 |
| 200 | [3] 150 | 36.3 | 4.9 | 79.6 | 15.5 | 5.13 | 7.1 | 96 |
| 200 | [4] 150 | 35.0 | 6.0 | 76.8 | 17.2 | 4.47 | 7.8 | 92 |

[1] Percent of total carbohydrates.
[2] Pullulanase added to starch paste 72 hours prior to α-amylase.
[3] Pullulanase added to starch paste simultaneous with α-amylase.
[4] Pullulanase added to starch paste in 50 unit/100 g. d.s. aliquots.
The first aliquot with the α-amylase, the second aliquot 24 hours later and the third aliquot 48 hours later.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A starch hydrolysate syrup having a DE ranging from about 25 to about 55, and containing about 60–85% of oligosaccharides having a degree of polymerization of from 2 to 6, and less than 35% of oligosaccharides having a degree of polymerization of 7 and higher, being further characterized by the following relationship:

$$\frac{DE}{DP_{2-6}/DP_{7+}} = n$$

where $DP_{2-6}$ represents said low molecular weight oligosaccharides, $DP_{7+}$ represents said high molecular weight oligosaccharides, DE is the dextrose equivalent and $n$ is a number ranging between about 4 and about 12.

2. The starch hydrolysate of claim 1 wherein the proportion of high molecular weight oligosaccharide ranges from about 10 to about 30%.

3. The hydrolysate of claim 1 where $n$ ranges from about 6 to about 12.

4. The hydrolysate of claim 1 which is derived from a corn starch.

5. The hydrolysate of claim 1 which is derived from a waxy milo starch.

6. A method of producing a starch hydrolysate syrup

11. The method of claim 10 wherein said conversion is carried out over 48–120 hours at a pH of from 5.0 to 7.0.

12. The method of claim 9 wherein said alpha-amylase enzyme is added prior to pullulanase enzyme addition.

13. The method of claim 9 wherein said pullulanase enzyme is added prior to alpha-amylase enzyme addition.

14. The method of claim 9 wherein said enzymes are added simultaneously to said gelatinized starch.

15. The method of claim 9 wherein said gelatinized starch has at least a 50% amylopectin content.

16. The method of claim 9 wherein said alpha-amylase enzyme is derived from the bacterium, *Bacillus subtillis*.

17. The method of claim 9 wherein said pullulanase enzyme is derived from the bacterium, *Aerobacter aerogenes*.

18. The method of claim 9 wherein said starch prior to conversion is thinned to a DE ranging from about 5 to about 15.

19. A starch hydrolysate solid derived from the syrup of claim 1.

20. The syrup of claim 1 derived from a starch having at least a 50% amylopectin content.

References Cited

Abudullah, M., et al., Cereal Chem. 1966 vol. 43, pp. 111–117.

Robyt, J., et al., Archives of Biochemistry and Biophysics, 1963, vol. 100, p. 455.

Reed et al., Enzymes in Food Processing, p. 261, Academic Press, 1966, New York, N.Y.

LIONEL M. SHAPIRO, Primary Examiner

U.S. Cl. X.R.

99—86, 134, 136; 195—31, 66